United States Patent [19]
Bernhardt et al.

[11] Patent Number: 5,966,681
[45] Date of Patent: Oct. 12, 1999

[54] COORDINATE MEASURING APPARATUS AND METHOD FOR CONTROLLING THE SAME

[75] Inventors: Ralf Bernhardt, Aalen; Otto Ruck, Pfahlheim; Günter Grupp, Böhmenkirch, all of Germany

[73] Assignee: Carl-Zeiss-Stiftung, Heidenheim, Germany

[21] Appl. No.: 08/993,990

[22] Filed: Dec. 18, 1997

[30] Foreign Application Priority Data

Dec. 21, 1996 [DE] Germany .......................... 196 53 771

[51] Int. Cl.⁶ .......................... G01B 5/012; G05B 19/19
[52] U.S. Cl. .......................... 702/152; 702/168; 702/167; 702/95; 702/41; 364/474.29; 364/474.37; 33/503; 33/504; 33/505
[58] Field of Search .......................... 702/152, 153, 702/168, 167, 95, 41; 364/474.29, 474.37; 33/503, 504, 505

[56] References Cited

U.S. PATENT DOCUMENTS

| | | | |
|---|---|---|---|
| 5,471,406 | 11/1995 | Breyer et al. | 702/168 |
| 5,594,668 | 1/1997 | Bernhardt et al. | 33/504 |
| 5,610,846 | 3/1997 | Trapet et al. | 702/95 |
| 5,623,766 | 4/1997 | Ruck et al. | 33/561 |

*Primary Examiner*—John Barlow
*Assistant Examiner*—Hien Vo
*Attorney, Agent, or Firm*—Walter Ottesen

[57] ABSTRACT

The invention is directed to a method which is provided for controlling coordinate measuring apparatus wherein a probe head (2) is moved and has a movably attached probe unit (24) attached thereto. The probe unit (24) is charged with a measurement force $\vec{F}$meas relative to the probe head (2). The measurement force $\vec{F}$meas operates against the mass inertial forces $\vec{F}$zp which occur because of acceleration of the probe. The measurement force $\vec{F}$meas is comprised of a desired measurement force $\vec{F}$des and a corrective measurement force $\vec{F}$corr. The desired measurement force $\vec{F}$des is constant in magnitude and is directed perpendicularly to the surface of the workpiece (15) to be measured. The corrective measurement force $\vec{F}$corr at least partially compensates for the mass inertial forces ($\vec{F}$tr, $\vec{F}$zp) which occur because of the acceleration of the probe unit (24).

10 Claims, 2 Drawing Sheets

COORDINATE MEASURING APPARATUS AND METHOD FOR CONTROLLING THE SAME

FIELD OF THE INVENTION

The invention relates to a method for controlling coordinate measuring apparatus wherein a probe head is driven. The probe head has a probe movably attached thereto. In the method, the probe is charged with a measuring force relative to the probe head. The invention also relates to a coordinate measuring apparatus corresponding to the method.

BACKGROUND OF THE INVENTION

A method of this kind is disclosed, for example, in U.S. Pat. No. 5,471,406. In this known method, geometric data of geometric elements of the workpiece in the form of desired data are transferred from a computer to the control system of the coordinate measuring apparatus. In the control system, the desired data are transformed into the machine coordinate system and are thereafter transferred to an interpolator which generates the position desired values along which the probe head with the movably attached probe is control driven. Furthermore, and in one embodiment, a desired measuring force is transferred additionally from the computer to the control system. A force controller continuously charges the probe with a measuring force relative to the probe head. This measuring force has a constant magnitude and is always normal to the workpiece surface to be measured.

Particular to the above method is that the magnitude of the adjusted measuring force is constant during the entire measuring sequence and corresponds to the pregiven desired measuring force. The actual probe force with which the probe ball of the probe is pressed against the surface of the workpiece to be measured, however, changes because of mass inertial forces which occur with accelerations of the probe. Centrifugal accelerations occur especially when scanning curved surface sections of the workpiece. These centrifugal accelerations act in the direction of the measuring force in concave curves so that the actual force with which the ball of the probe is pressed against the surface of the workpiece is increased. For convex curves, the centrifugal accelerations operate opposite to the measuring force and thereby reduce the actual force with which the ball of the probe is pressed against the surface of the workpiece. For a rapid movement on convex curves, the centrifugal force can even be greater than the applied measuring force so that the probe, that is, the probe ball attached thereto, lifts off of the workpiece surface. In each case, the measuring results are made incorrect by the above effects so that the path speed of the probe must be greatly reduced before reaching the curved surface sections of the workpiece to avoid the above effects. This is described in detail in U.S. patent application Ser. No. 08/693,632, filed Aug. 9, 1996, and incorporated herein by reference.

The reduction of the path speed, however, leads to increases in measuring time especially for workpieces which have many curves such as gear wheels, shafts, engine blocks, et cetera.

SUMMARY OF THE INVENTION

It is an object of the invention to provide a method for controlling a coordinate measuring apparatus wherein the measuring time is greatly reduced.

The method of the invention is for controlling a coordinate measuring apparatus including a control system and a probe head having a probe unit movably attached thereto. The method includes the steps of: control driving the probe head and the probe unit along a path for measuring a workpiece having a surface whereby mass inertial forces are developed because of an acceleration of the probe unit along the path; forming a desired measuring force ($\vec{F}$des) which is constant in magnitude and is directed perpendicularly to the surface; generating a corrective measuring force ($\vec{F}$corr) for at least partially compensating the mass inertial forces ($\vec{F}$tr, $\vec{F}$zp); forming a measuring force ($\vec{F}$meas) from the desired measuring force ($\vec{F}$des) and the corrective measuring force ($\vec{F}$corr); and, applying the measuring force ($\vec{F}$meas) to the probe unit relative to the probe head.

The special advantage of the method is that also curved surface sections can be scanned with a relatively high path velocity without the force being changed thereby with which the ball on the probe is pressed against the workpiece surface. In this way, considerably faster measurements can be made as was possible up to now. This applies especially to workpieces having a plurality of curved surface sections such as gear wheels, cylinders, engine blocks, et cetera.

The determination of the corrective measuring force can take place in different ways. One possibility is to pregive a corrective measuring force which is constant in magnitude when inertial forces occur. This corrective measuring force operates in a direction opposite to the mass inertial force.

In this way, mass inertial forces of the probe in a coordinate measuring apparatus are compensated in a simple manner so that the ball attached to the probe can no longer lift off at least when contact scanning convexly curved surface sections. However, the method does have the disadvantage that the occurring mass inertial forces are corrected only imprecisely so that measurement errors occur as previously.

In an especially advantageous embodiment, the corrective measuring force is selected proportional to the mass inertial forces and the proportionality factor is advantageously so selected that the direction of the corrective measuring force is precisely opposite to the resulting mass inertial force and the magnitude of the corrective measuring force is equal to the magnitude of the resulting mass inertial force.

The corrective measuring force is usually determined from the path acceleration of the probe head. The path acceleration is especially advantageously determined either from the time-dependent differentiation of the measured machine positions or from the time-dependent derivative of the position desired values. Furthermore, the path acceleration can be qualitatively estimated from the curvature of the path. Of course, the acceleration can also be determined by an acceleration detector which, for example, can be mounted in the probe head.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
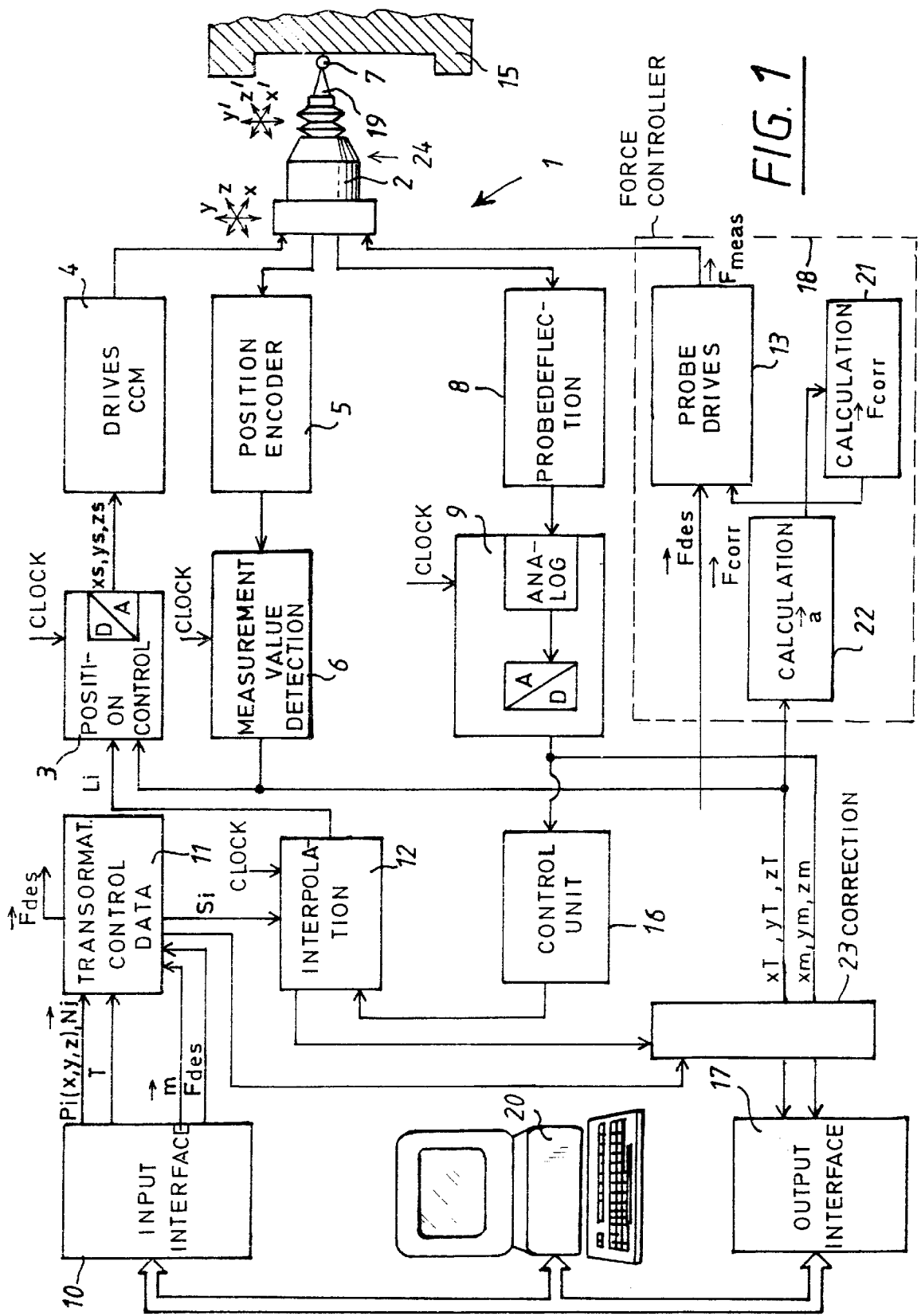
FIG. 1 is a simple schematic showing the essential components of the control system of the coordinate measuring apparatus with which the method of the invention is performed; and, FIG. 2 shows a schematic of a scanning operation of a workpiece utilizing the control system shown in FIG. 1.

FIG. 1 shows a schematic of the control system 1 of a coordinate measuring apparatus which control drives a probe head 2 and a probe unit 24 in accordance with desired data. The probe unit 24 is movably attached to the probe head 2. Such a probe unit and probe head are shown, for example, in U.S. Pat. No. 5,623,766 incorporated herein by reference.

Before the operation of the control system 1 is described, the precise definition of the term "probe unit 24" will be explained. In connection with the control system 1, it is understood that the term "probe unit 24" includes all those components which are movably attached to the probe head 2. For the probe unit 24 shown here only as an example, these components include, in addition to the probe pin 19 and the probe ball 7, the change-holding device (not shown) via which the probe pin 19 is exchangeably attached to the probe head 2, the mechanics which journal the probe pin 19, the probe ball 7 and the change-holding device movably on the probe head 2, the plunger coils of the measuring force generators as well as the plunger coils which serve to measure the deflection of the probe pin.

The precise operation of the coordinate measuring apparatus will now be explained.

The control system 1 of the coordinate measuring apparatus is connected via the input interface 10 and the output interface 17 to the evaluation computer 20 of the coordinate measuring apparatus. The following data are, inter alia, transferred via the input interface 10 to the control system 1:
(a) the transformation matrix T, which defines the position of the workpiece coordinate system WKS in the machine coordinate system MKS of the coordinate measuring apparatus;

(b) the vector ($\vec{m}$), which defines the offset of the center point of the probe ball 7 used in the machine coordinate system MKS from a reference point on the probe head 2 of the coordinate measuring apparatus; and, (c) the magnitude of the desired measuring force ($\vec{F}$des), which the probe pin 19 and the probe ball 7 attached thereto should apply to the workpiece 15 to be scanned.

In addition, those data are transferred via the input interface 10 which are required to define the desired contour to be scanned by the probe ball 7 attached to the probe pin 19. These are, for example, the point sequences Pi(x, y, z). At the same time, and insofar as available, the normal vectors ($\vec{N}$i) can be transferred, which are assigned to the individual points (Pi(x, y, z)), respectively, which define the normal direction toward the surface of the workpiece 15 to be measured at the corresponding points.

The most important component(s) of the control system 1 are one or more microprocessors. Accordingly, some of the function component groups shown in FIG. 1 are not realized as hardware but as part of the firmware of these microprocessors. This applies, for example, also to the function component group 11 entitled "transformation control data" which immediately follows the input interface 10. From the data received, the function component group 11 computes the path data with which the probe ball 7 is to be moved relative to the workpiece 15. These path data are transferred via a coordinate transformation into the control system, that is, the machine coordinate system MKS.

In the function component group 12 (interpolation), the processed discrete path data Si to be scanned are interpolated in accordance with a pregiven algorithm at the clock frequency of the control system and position desired values Li are transferred to the downstream position controller 3 for the drives of the three measurement axes of the coordinate measuring apparatus. The algorithm can, for example, be linear or be a spline algorithm.

The position desired values, which are generated in the position controller 3, are subsequently converted from digital to analog values and are transferred as analog actuating quantities to the three drives 4 for the x, y and z axes of the coordinate measuring apparatus. Likewise, the displacement measuring systems 5 of the coordinate measuring apparatus are connected to the position controller 3. This connection is made via the function component group 6 (measurement value detection). This function component group 6 provides for a cyclical detection of the machine positions (xm, ym, zm), that is, the position of the probe head 2 in the machine coordinate system MKS and closes the position control loop for the measurement three axes of the coordinate measuring apparatus.

The control system 1 shown of FIG. 1 likewise includes the electronics 8 for further processing the signals outputted by the measurement-value transducers in the probe head 2. These signals define the deflection of the probe unit 24 when the probe ball 7 contacts the workpiece 15 in the three spatial directions. The probe ball is attached to the probe pin 19. The position signals emanating from these measurement-value transducers are processed in the electronics 8 and are converted into digital signals in the function component group 9. In the following, these signals represent the probe deflection (xT, yT, zT). In the same manner as the machine positions (xm, ym, zm), the probe deflection (xT, yT, zT) is applied to the output interface 17 via a function component group 23 (correction) which is described further below. The probe deflection is needed by the computer 20 to calculate the measurement result.

Furthermore, the control system 1 includes a controller 16 connected to the function component group 9. The controller 16 monitors the probe deflection (xT, yT, zT) which defines the deflection of the probe pin in the three spatial directions. If the probe deflection (xT, yT, zT) exceeds certain pregiven values, then the controller 16 applies a disturbance quantity to the function component group 12 (interpolator) via which the path is so corrected that the deflection of the probe unit 24 is again returned to the permissible region.

In the following, the force controller 18 is described with which the method of the invention is carried out.

The force controller 18 is arranged in the control system 1 and adjusts the charge of the probe unit 24 with a measuring force $\vec{F}$meas relative to the probe head 2. The measuring force $\vec{F}$meas is composed of:

(a) a desired measuring force $\vec{F}$des which is constant in magnitude and directed normally toward the surface of the workpiece 15 to be measured; and, (b) a corrective measuring force $\vec{F}$corr which serves to at least partially compensate mass inertial forces ($\vec{F}$tr, $\vec{F}$zp) which occur because of the acceleration of the probe unit 24.

To generate the measuring force, either adjustable measuring force generators are arranged in the probe head 2 as shown in the embodiment of FIG. 1 or, springs are provided which generate a measuring force proportional to the deflection of the probe unit 24 in the measurement directions (x, y, z).

The measuring force generators used here are realized in the form of, for example, linear motors or plunger coil magnets. The measuring force generators deflect the probe unit 24 in response to a pregiven signal $\vec{F}$meas in the three spatial directions (x, y, z). The corresponding function component group 13 (probe drives) receives the information as to magnitude and direction of the measuring force $\vec{F}$meas to be adjusted from the function component group 11 (transformation control data) in the form of signals of a desired measuring force $\vec{F}$des as well as from the function component group 21 (calculation corrective measuring force) in the form of a signal which represents the corrective measuring force $\vec{F}$corr.

The signal for the desired measuring force $\vec{F}$des includes direction and magnitude of the measuring force, which is to be adjusted for each of the three spatial directions (x, y, z), so that the measuring force $\vec{F}$meas which is adjusted hereby, is normal to the surface of the workpiece 15 to be measured and the magnitude of the measuring force resulting therefrom corresponds to the magnitude of the value of the desired measuring force $\vec{F}$des, which is transmitted by the computer 20 to the function component group 11 (transformation control data). The signal of the desired measuring force $\vec{F}$des is applied to the function component group 13 (probe drives) and is generated in the function component group 11 (transformation control data) from the magnitude of the desired measurement force $\vec{F}$des inputted by the computer 20 and from the normal vectors $\vec{N}$i belonging to the individual points Pi.

Furthermore, the measuring force $\vec{F}$meas is adjusted by the function component group 13 (probe drives) on the basis of the signal for the corrective measuring force $\vec{F}$corr which is superposed on the desired measurement force $\vec{F}$des. The corrective measurement force $\vec{F}$corr provides the additional corrective measuring force to be applied for each of the three spatial directions (x, y, z). The signal of the corrective measuring force $\vec{F}$corr is determined by the component group 22 (calculation path acceleration) and by the function component group 21 (computation corrective measurement force).

The function component group 22 (computation path acceleration) determines the second derivative of time for each of the spatial directions (x, y, z) from the machine positions (xm, ym, zm) detected by the function component group 6 (measurement value detection). In this way, a three-dimensional path acceleration vector $\vec{a}$ is determined:

$$\vec{a} = \left( \frac{d^2 x}{d t^2}; \frac{d^2 y}{d t^2}; \frac{d^2 z}{d t^2} \right)$$

The path acceleration vector $\vec{a}$ computed in this manner is transmitted to the function component group 21 (computation corrective measurement force) wherein the path acceleration vector $\vec{a}$ is multiplied by the probe mass mprobe as follows:

$$\vec{F}corr = mprobe * \vec{a}$$

in order to hereby obtain a vector for the corrective measurement force $\vec{F}$corr.

The probe mass mprobe is the entire mass of the probe unit 24 and can be determined as follows. The coordinate measuring apparatus is so driven with the unclamped probe unit 24 that the probe unit 24 is subjected to a directional acceleration as well as a path acceleration $\vec{a}$tm which is constant in magnitude. The force $\vec{F}$halt is measured which is needed in order to hold the probe unit 24 at its rest position. With the relationship:

$$mprobe = \frac{\vec{F}halt}{\vec{a}tm}$$

the probe mass mprobe can easily be computed. As noted above, it is to be noted that, in the probe mass mprobe, there is not only the probe pin 19 and the probe ball 7 which account therefor but also all parts fixedly connected therewith which are movably journalled relative to the probe head 2.

The computed vector for the corrective measuring force $\vec{F}$corr is, as mentioned above, transferred to the function component group 13 (probe drives) and is therein superposed with the desired measurement force $\vec{F}$des via a vector addition and the vector of the measurement force $\vec{F}$meas resulting therefrom, is applied to the probe unit 24 with the measurement force $\vec{F}$meas relative to the probe head 2.

The corrective measurement force $\vec{F}$meas is computed in the function component group 21 (computation corrective measurement force). This corrective measurement force $\vec{F}$meas is identical in magnitude to the mass inertial force ($\vec{F}$tr, $\vec{F}$zp) which is generated by the path acceleration $\vec{a}$ and operates precisely opposite to the mass inertial force ($\vec{F}$tr, $\vec{F}$zp). For this reason, the corrective measuring force $\vec{F}$corr is adjusted proportional to the mass inertial forces ($\vec{F}$tr, $\vec{F}$zp) by the force controller 18. The force controller 18 determines the corrective measurement force $\vec{F}$corr from the path acceleration $\vec{a}$ of the probe head 2. The path acceleration $\vec{a}$ can either be determined from the time-dependent derivative of the measured machine positions (xm, ym, zm) as in the control system 1 of FIG. 1 or from the time-dependent derivative of the path support points Li.

It is understood that the acceleration can also be determined by an acceleration detector, which can, for example, be mounted in the probe head. Sensors which can be used are, for example, seismic or piezoelectric acceleration detectors.

The mass inertial forces can occur with accelerated movements of the probe unit 24 or of the probe head 2. In addition to a change of the measurement force $\vec{F}$meas, these mass inertial forces, however, also cause a bending of the components of the coordinate measuring apparatus such as the probe pin 19 and the structure on which the probe head 2 is suspended. Even if no mass inertial forces occur, the probe pin 19 can be bent alone by the applied measurement force $\vec{F}$meas. It is therefore especially advantageous in the control system 1 of FIG. 1 to provide a function component group 23 (correction) wherein the probe deflection (xT, yT, zT) as well as the machine positions (xm, ym, zm) are corrected in correspondence to a previously stored corrective table in dependence upon the position desired value Li and the data of the component group 11 (transformation control data). The precise procedure for correcting the corresponding signals is detailed in U.S. Pat. Nos. 5,594,668 and 5,610,846 both of which are herewith incorporated by reference.

In view of the above, a function component group 23 is provided which can correct the static and dynamic bending of the probe pin 19 and the structure of the coordinate measuring apparatus.

Further information as to individual function component groups of the control system 1 is presented in U.S. Pat. No. 5,471,405 which is also incorporated herein by reference.

Figure 2:
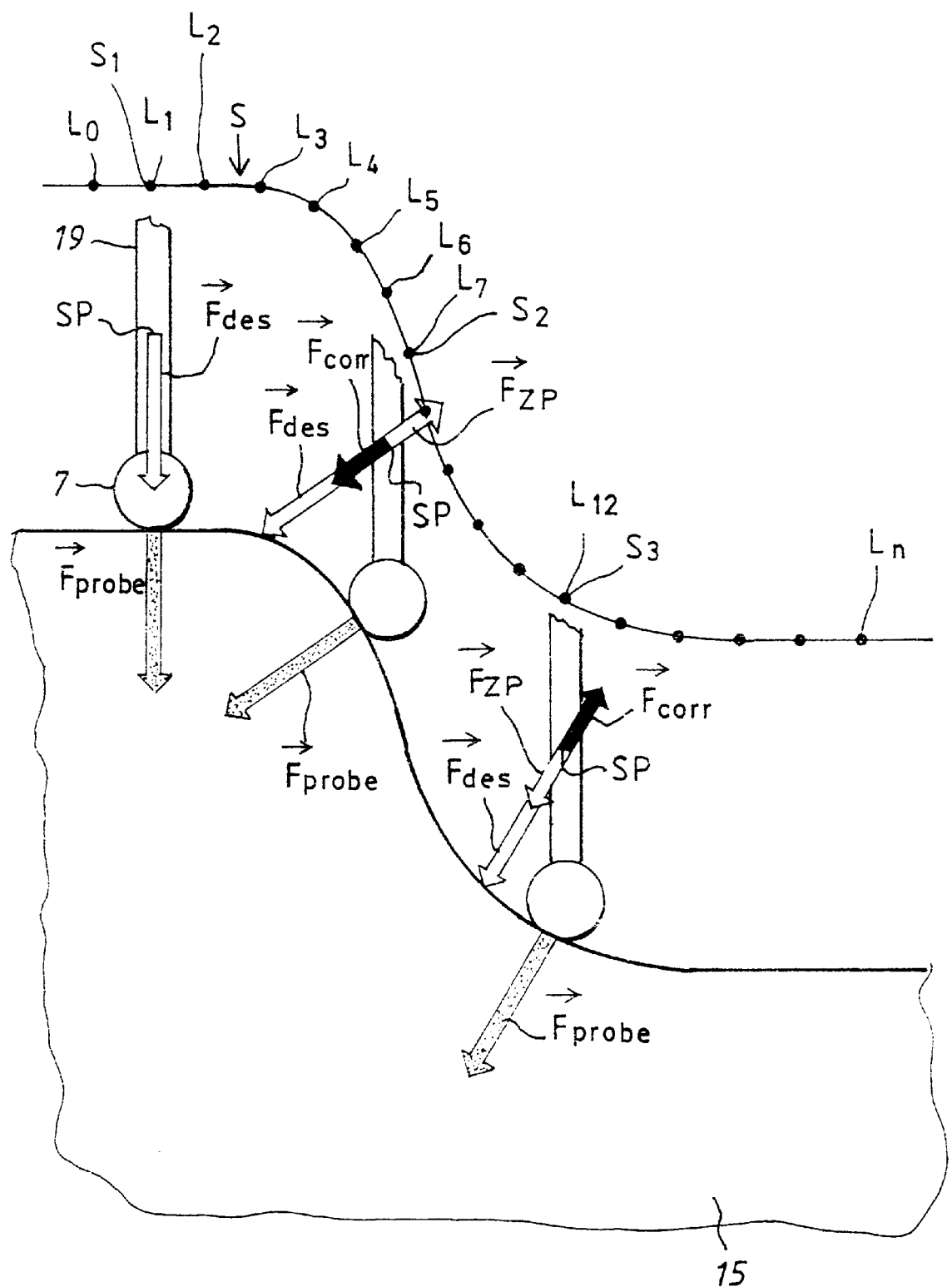

The precise operation of the control system 1 will now be explained with reference to FIG. 2.

Reference character S identifies the path on which the probe ball 7 is intended to be driven. (S1, S2, S3, . . . ) are the individual path data Si which are transferred from the function component group 11 (transformation control data) to the function component group 12 (interpolation). The function component group 12 then computes the position desired values (L1, L2, . . . ) between the path data (S1, S2, S3 . . . ) along which the probe ball 7 is moved from position desired value Li to position desired value (Li+1) at a fixed pregiven clock frequency. As shown in FIG. 2, the probe ball 7 is at a position desired value L1 in a movement having constant velocity so that no mass inertial forces occur. The probe unit 24 is therefore here only charged with the desired measurement force $\vec{F}$des which acts perpendicularly to the surface of the workpiece 15 and is at constant magnitude. The force $\vec{F}$probe therefore corresponds in magnitude and direction to the desired force $\vec{F}$des. The force $\vec{F}$probe is the force with which the probe ball 7 is pressed against the surface of the workpiece 15.

At position desired value L6, the probe unit 24 is guided over a convexly curved surface section of the workpiece 15 so that a mass inertial force in the form of a centrifugal force $\vec{F}$zp occurs. The component group 22 (computation path acceleration) and component group 21 (computation corrective measurement force) therefore determine a corrective measurement force $\vec{F}$corr as described above. This force is applied in addition to the desired measurement force $\vec{F}$des which is perpendicular to the workpiece surface so that the resultant measurement force $\vec{F}$meas is conjointly defined by the desired measurement force $\vec{F}$des and the corrective measurement force $\vec{F}$corr. The corrective measurement force $\vec{F}$corr compensates the centrifugal force $\vec{F}$zp. For this reason, the actually effective force $\vec{F}$probe accordingly corresponds to the desired measurement force $\vec{F}$des. The force $\vec{F}$probe is the force with which the probe ball 7 is pressed against the workpiece surface. The situation is the same in the position desired value L12 with one single difference, namely, that here a concavely curved surface section is measured so that a centrifugal force $\vec{F}$zp is directed onto the surface; whereas, the corrective measurement force $\vec{F}$corr is directed away from the workpiece surface.

It is understood that the foregoing description is that of the preferred embodiments of the invention and that various changes and modifications may be made thereto without departing from the spirit and scope of the invention as defined in the appended claims.

What is claimed is:

1. A method for controlling a coordinate measuring apparatus including a control system and a probe head having a probe unit movably attached thereto, the method comprising the steps of:

control driving said probe head and said probe unit along a path for measuring a workpiece having a surface whereby mass inertial forces are developed because of an acceleration of said probe unit along said path;

forming a desired measuring force ($\vec{F}$des) which is constant in magnitude and is directed perpendicularly to said surface;

generating a corrective measuring force ($\vec{F}$corr) for at least partially compensating said mass inertial forces ($\vec{F}$tr, $\vec{F}$zp);

forming a measuring force ($\vec{F}$meas) from said desired measuring force ($\vec{F}$des) and said corrective measuring force ($\vec{F}$corr); and, applying said measuring force ($\vec{F}$meas) to said probe unit relative to said probe head.

2. The method of claim 1, wherein said corrective measuring force ($\vec{F}$corr) is selected to be proportional to said mass inertial forces.

3. The method of claim 1, wherein said corrective measuring force ($\vec{F}$corr) is determined from the path acceleration ($\vec{a}$) of said probe head.

4. The method of claim 3, wherein the path acceleration ($\vec{a}$) of said probe head is determined from one of the time-dependent derivatives of the measured machine positions (xm, ym, zm) and the time-dependent derivative of the position desired values (Li).

5. A coordinate measuring apparatus for measuring a workpiece having a surface, the coordinate measuring apparatus comprising:

a probe head having a probe unit attached thereto;

a control system for control driving said probe head and said probe unit along a path for measuring said workpiece whereby mass inertial forces occur because of an acceleration of said probe unit along said path;

a first device for forming a desired measuring force ($\vec{F}$des) directed perpendicularly to said surface and having a constant magnitude;

said control system including a second device for determining a corrective measuring force ($\vec{F}$corr) which at least partially compensates for said mass inertial forces ($\vec{F}$tr, $\vec{F}$zp); and, said control system further including a third device for combining said desired measuring force ($\vec{F}$des) and said corrective measuring force ($\vec{F}$corr) to form a measuring force ($\vec{F}$meas) and for adjusting the application of said measuring force ($\vec{F}$meas) to said probe unit relative to said probe head.

6. The coordinate measuring apparatus of claim 5, said second device being adapted to select said corrective measuring force ($\vec{F}$corr) proportional to said mass inertial forces ($\vec{F}$tr, $\vec{F}$zp).

7. The coordinate measuring apparatus of claim 6, wherein said second device determines said corrective measuring force ($\vec{F}$corr) from the path acceleration ($\vec{a}$) of said probe head.

8. The coordinate measuring apparatus of claim 7, wherein said second device determines said path acceleration ($\vec{a}$) from one of the time-dependent derivative of the measured machine positions (xm, ym zm) and the time-dependent derivative of the position desired values (Li).

9. The coordinate measuring apparatus of claim 5, wherein said probe head includes one of the following to generate the measuring force: an adjustable measuring force generator and springs which generate a measuring force proportional to the deflection of said probe unit in the measuring directions (x, y, z).

10. The coordinate measuring apparatus of claim 5, wherein said control system includes a function component group for correcting the static and dynamic bending of the probe pin and of the mechanism for moving said probe head.

* * * * *